(12) United States Patent
Sadosky, Jr. et al.

(10) Patent No.: US 6,857,239 B2
(45) Date of Patent: Feb. 22, 2005

(54) ROOF PANEL AND A METHOD OF MANUFACTURING THEREOF

(75) Inventors: Lenard Sadosky, Jr., Arlington, TX (US); John Miller, Corona, CA (US); Natalie Tanner, Anaheim, CA (US); Joseph O. Wilson, Menifee Valley, CA (US); Nigel Baas, Auckland (NZ); Toone Elzink, Auckland (NZ); Stuart Hayman, Auckland (NZ); Peter Richards, Auckland (NZ)

(73) Assignee: Decra Roofing Systems, Inc., Corona, CA (US)

( * ) Notice: Subject to any disclaimer, the term of this patent is extended or adjusted under 35 U.S.C. 154(b) by 154 days.

(21) Appl. No.: 09/795,644

(22) Filed: Feb. 26, 2001

(65) Prior Publication Data

US 2004/0088937 A9 May 13, 2004

(Under 37 CFR 1.47)

(51) Int. Cl.[7] .................................................. E04D 1/00

(52) U.S. Cl. .............................. 52/518; 52/555; 52/558; 52/519; 52/311.1; 52/314; 52/523

(58) Field of Search ......................... 52/553, 554, 555, 52/557, 559, 518, 519, 311.1, 314, 523, 539, 558, 311; D25/141, 139

(56) References Cited

U.S. PATENT DOCUMENTS

| | | | | |
|---|---|---|---|---|
| 3,760,546 A | * | 9/1973 | Martin | 52/555 |
| 3,921,358 A | * | 11/1975 | Bettoli | 52/311 |
| D256,954 S | * | 9/1980 | Morita | D25/139 |
| 4,717,614 A | | 1/1988 | Bondoc et al. | 428/143 |
| D309,027 S | | 7/1990 | Noone et al. | 52/553 |
| 5,174,092 A | * | 12/1992 | Naden | 52/553 |
| 5,232,530 A | | 8/1993 | Malmquist et al. | 156/78 |
| 5,495,654 A | * | 3/1996 | Goodhart et al. | 29/527.4 |
| 5,611,186 A | | 3/1997 | Weaver | 52/557 |
| 5,644,886 A | * | 7/1997 | Ekmark et al. | 52/518 |
| 5,666,776 A | | 9/1997 | Weaver et al. | 52/557 |
| D394,719 S | * | 5/1998 | Costantini | D25/140 |
| D410,094 S | * | 5/1999 | Hedges et al. | D25/143 |
| 5,946,876 A | * | 9/1999 | Grace | 52/520 |
| D449,897 S | * | 10/2001 | Croft | D25/141 |

FOREIGN PATENT DOCUMENTS

JP          3-25143          *  6/1989          ............. E04D/1/16

* cited by examiner

*Primary Examiner*—Carl D. Friedman
*Assistant Examiner*—Chi Q. Nguyen
(74) *Attorney, Agent, or Firm*—Ladas & Parry LLP

(57) ABSTRACT

A single metal sheet roofing panel having a plurality of alternatively raised and lowered patches longitudinally arranged in three rows. The panel 30 comprises a side clip connection system for laterally connecting adjacent panels. The panel is coated with the stone based coating and has a unique patterned appearance of multiple colors and shades. A method for manufacturing of the panel.

29 Claims, 7 Drawing Sheets

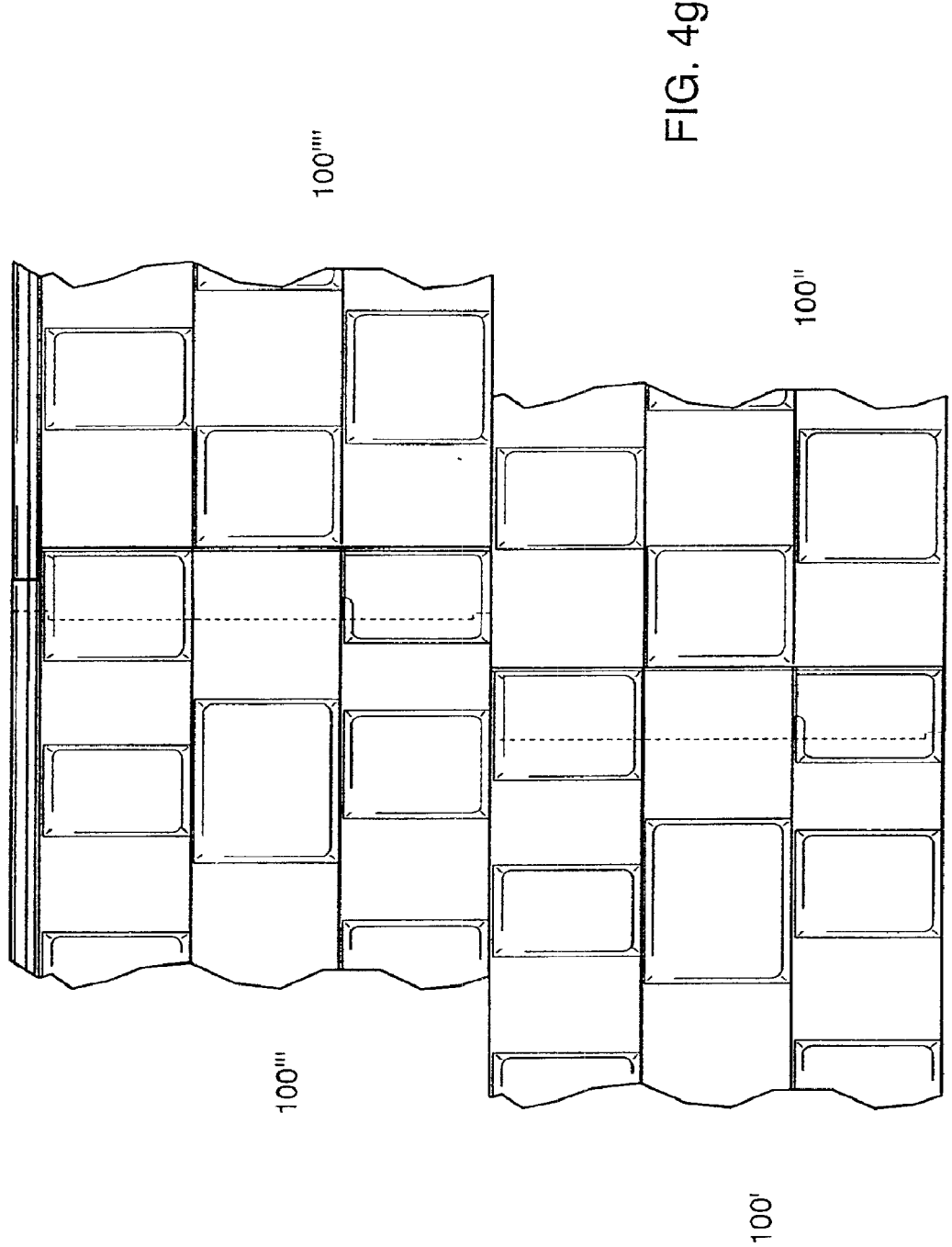

ROOF PANEL AND A METHOD OF MANUFACTURING THEREOF

BACKGROUND OF THE INVENTION

1. Field of the Invention

This invention relates to the field of roofing products. More particularly, it pertains to the multi-step dimensional metal roof panels having a TAC-LOK™ side clip connection system and stone-coated in a particular way so as to have a unique multi-colored, multi-shade appearance.

2. Description of the Related Art

In the art of roof shingles, it is important to provide a shingle which has good structural characteristics, ease of installation, durability, and pleasant appearance. Even though metal panels offer significant life time cost savings, service life and flammability advantages over wood shingles, wood shingles are still often preferred due to the pleasing aesthetic appearance of a wood shingled roof. An important aesthetic advantage of such wood shingles is due to their greater thickness as compared to steel panels or composite shingles. The higher thickness of wood shingles leads to a more pleasing, layered look for the finished roof.

Various composite shingles have been developed to provide an appearance of thickness comparable to wood shingles. Examples of such composite or asphalt shingles are shown in U.S. Pat. No. 5,232,530 to Malmquist, et. al. (asphalt-and-polymer composite); U.S. Pat. No. 3,921,358 to Bettoli (asphalt composite); U.S. Pat. No. 4,717,614 to Bondoc, et. al. (asphalt composite); and U.S. Design Pat. No. D309,027 to Noone et. al. (asphalt). None of these patents teaches a metal-based roof panel, and structural characteristics of all these shingles are inferior to those of metal-based roof panels.

Another group of patents includes two U.S. Patents to Weaver et. al., U.S. Pat. Nos. 5,611,186 and 5,666,776. Both of these patents claim to achieve the pleasing aesthetic appearance of the wood shingles. However, the shingles described in these patents are asphalt based laminated products, the structural strength of which is inferior to that of metal-based panels. In addition, the shingles described in these two patents are one-step shingles, the process of installation of which is very time-consuming.

In view of the foregoing problems and disadvantages inherent in the shingles taught in prior art, there exists, therefore, a need for an improved roofing product which would have the following improved characteristics:

(a) it is metal-based;
(b) it is a multiple-step product to improve the aesthetic appearance and to facilitate its installation;
(c) it has a mechanism allowing secure lateral connection of adjacent panels; and
(d) it has a pleasing, dimensional, layered look for the finished roof comparable to the look provided by wood shingles.

There exists no known prior art roofing product having all the advantages and benefits described above. Yet the need for such is acute. The present invention discloses such roofing product, its assembly and a method for manufacturing thereof.

SUMMARY OF THE INVENTION

This invention is applicable to metal-based roof panels. In general terms, the present invention uses a multiple-step, preferably, a three-step, metal panel, having a side clip system for connecting adjacent panels. The panel is coated in a special way to have multi-colored, multi-shade appearance. This appearance is similar to that of a wood shingle in that the panel appears to have a significant depth.

According to a first aspect of this invention, a roof panel is provided, the panel comprising a single-piece metal panel having a front surface and a back surface, a lengthwise edge and a lateral edge, the panel comprising a plurality of alternating raised and lowered sections, a lap including a plurality of claws, the lap disposed along the lateral edge of the panel, a side lap channel disposed adjacent the lap, and a plurality of pockets disposed on the back surface, whereby the claws of a first panel are engagedly connected with the pockets of a second panel to form a side clip connection when the lateral edge of the first panel and the lateral edge of the second panel are attached to form an assembly.

According to a second aspect of this invention, an assembly of a plurality of roof panels is provided, the assembly comprising a first metal panel having a plurality of claws, and a second metal panel having a plurality of pockets, whereby the claws are engagedly connected with the pockets to form a side clip connection when the first panel and the second panel are laterally attached to form the assembly.

According to a third aspect of this invention, a method for manufacturing a metal roof panel from a single sheet of metal is provided, the method comprising steps of providing the sheet metal in an uncoiled form, forming metal panels having a front surface and a back surface, a lengthwise edge and a lateral edge, the metal panels provided with a plurality of alternating raised and lowered sections, and applying a stone-chip based coating on the front surface of the metal panels, to form a pattern of differently colored areas, the areas being coordinated with the alternating raised and lowered sections.

According to a fourth aspect of this invention, such pattern of differently colored areas is achieved by providing stone granules having differing colors, preparing mixtures of the granules having differing ratios between the granules having the differing colors, and applying the mixtures to pre-selected areas of the panel.

BRIEF DESCRIPTION OF THE DRAWINGS

The features and advantages of the present invention will become better understood with regard to the following description, appended claims, and accompanying drawings where

FIG. 4g is a plan view showing four panels being joined together.

DETAILED DESCRIPTION OF THE INVENTION

Figure 1:
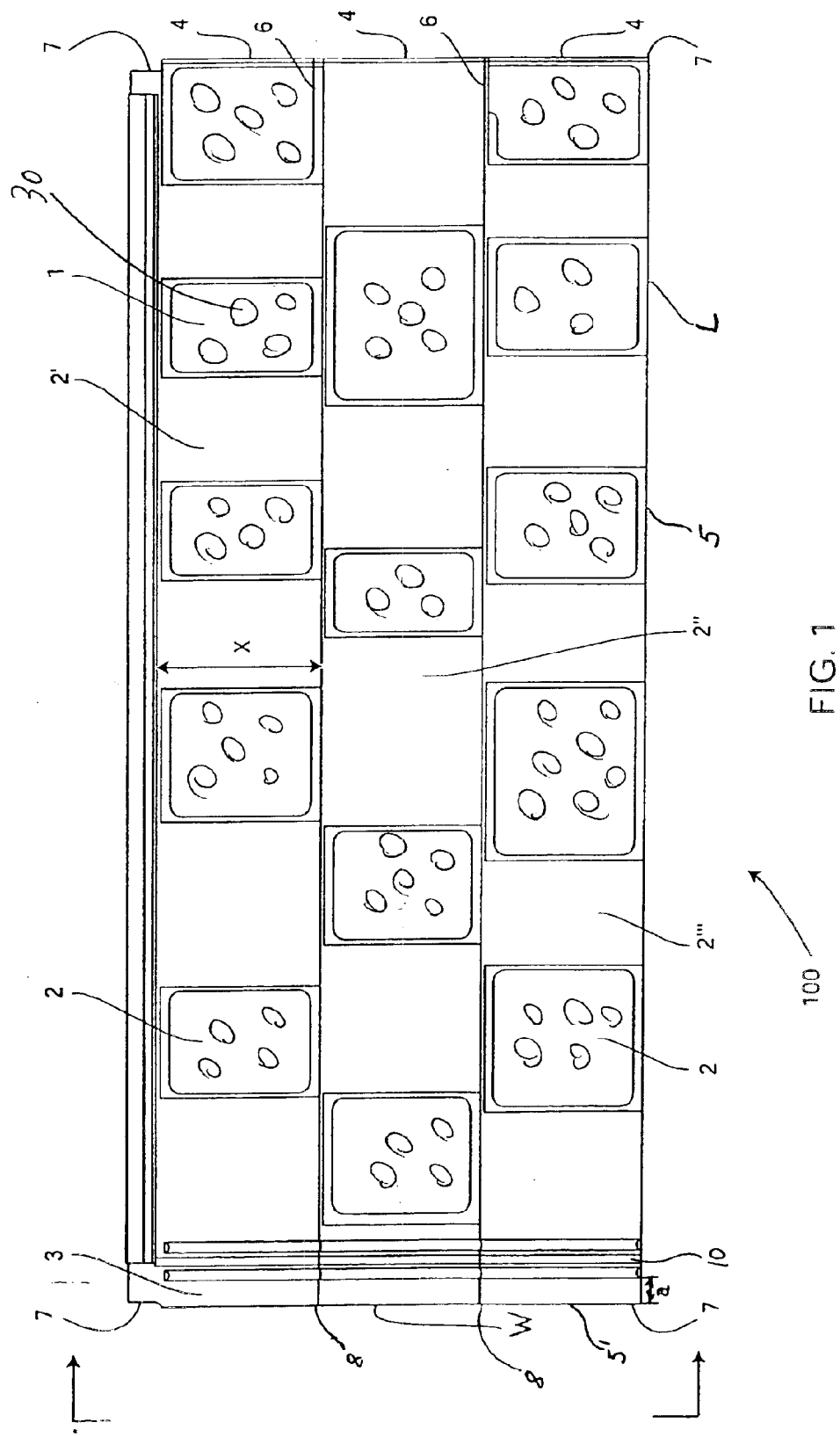
FIG. 1 is a schematic diagram showing a plan view of a preferred embodiment of the panel of this invention.
Figure 1A:
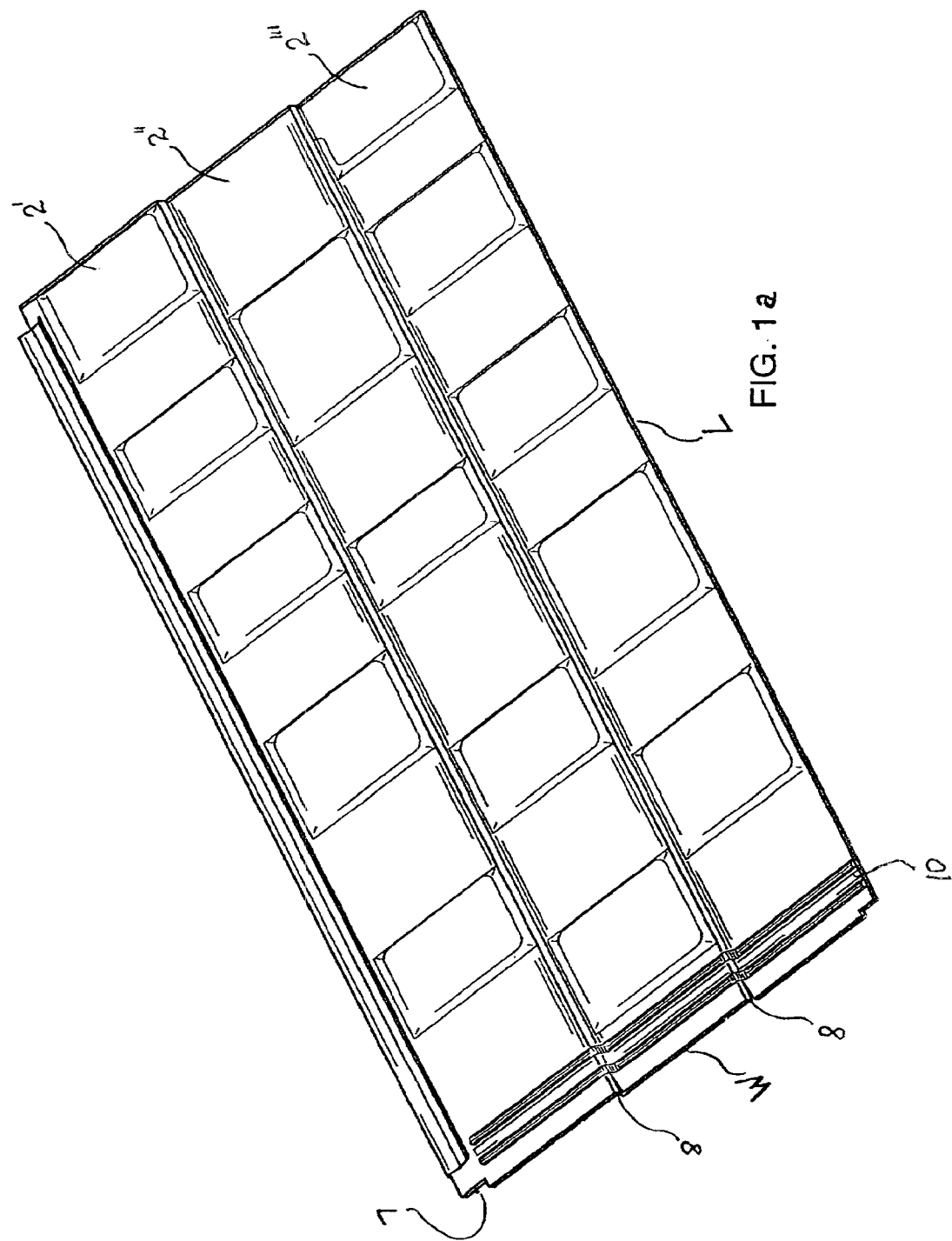
FIG. 1a is a schematic diagram showing a perspective view of a preferred embodiment of the panel of this invention.

FIG. 1 shows a plan view of a preferred embodiment of the panel 100 of this invention, as view when looked at it when the panel is laid down, with the front side 1 (coated) up. FIG. 1a shows the same preferred embodiment of the panel 100 of this invention in a perspective view. The front side 1 is coated with a stone-chip based coating 30 in a plurality of color mixes in selectable locations to form a pattern of differently colored areas, the areas being coordinated with said alternating raised and lowered sections.

In accordance with the present invention, the panel 100 is made preferably of a single sheet of a material, preferably metal, and more preferably, steel. The kind of steel used to manufacture the panel of this invention is preferably zinc-aluminum coated steel of grade 37 according to the classification adopted by the American Society for Testing of Materials, ASTM A792.

Such steel has a thickness within a range of between about 0.31 millimeters and about 0.55 millimeters, preferably within a range of between about 0.42 millimeters and 0.46 millimeters, and more preferably, about 0.44 millimeters. The zinc-aluminum coating is preferably grade AZ-50 coating, according to the ASTM's classification. The front side of the sheets of steel used to manufacture the panels of this invention is typically pre-coated with a water-based acrylic primer by the manufacturer of the steel sheet, which is preferably Steelscape, Inc. of Kalama, Wash.

Other metals having similar properties can be used instead of steel described hereinabove. It should be borne in mind that those reasonably skilled in the art of making roof panels will know what those metals are and how they can be used to replace this kind of steel.

The total dimensions of the sheet of metal used to fabricate the panels of this invention is preferably about 1.35 meters in length L (as shown on FIG. 1) by about 0.5 meters in width W. (as shown on FIG. 1 also).

Figure 3:
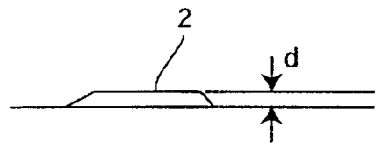
FIG. 3 is a schematic diagram showing a side view of a raised section of the panel of this invention.

The panel comprises multiple, and preferably three, longitudinal rows 2', 2" and 2'" of alternatively raised and lowered sections 2. These sections 2', 2" and 2'" mimic non-metal shingles in order to give a roof covered with panels 100 a natural shingled appearance. The width x (shown on FIG. 1) of a row the raised and lowered sections 2 is preferably about 16 cm. The height d of these sections 2 (shown on a side view of the patch 2, in FIG. 3) is preferably within a range of between about 2 millimeters and about 10 millimeters, and more preferably, within a range of between about 3 millimeters and about 5 millimeters.

Figure 2A:
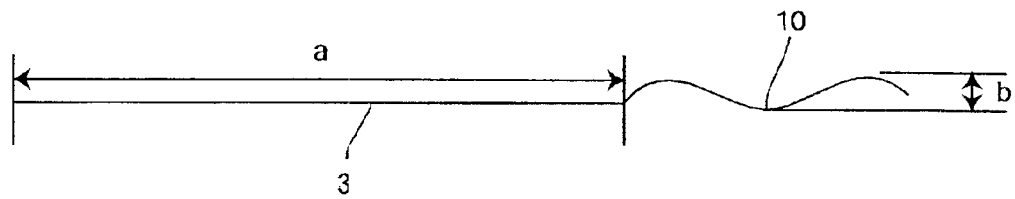
FIG. 2a is a schematic diagram showing a side view of the left side lap of the panel of this invention.
Figure 2B:
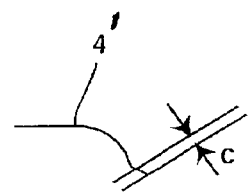
FIG. 2b is a schematic diagram showing a side view of the right flange of the panel of this invention.

The panel 100 further comprises a notch 7, having a length of between about 1 millimeter and about 3 millimeters, preferably, about 2 millimeters, and a side lap 3 having a width, a, within a range of between about 29 millimeters and about 31 millimeters, preferably, about 30 millimeters, as shown on FIG. 2a. The side lap 3, in turn, includes a plurality of claws 8, to be discussed subsequently. Between the side lap 3 and the body of the panel 100 is preferably provided a side lap channel 10 (FIG. 2a), the purpose of which is to provide for the removal of water which may accumulate on the front side 1 of the panel 100 when the panel is installed on a roof and the weather is inclement. The side lap channel 10 runs along a majority of the width W of the panel 100 and preferably has a depth, b (See FIG. 2a), within a range of between about 3.21 millimeters and about 5.21 millimeters.

On the side 4 of the panel 100 opposite to the side where the side lap 3 is located, there is a curved flange 41, preferably having a tip with a width, c, up to about 1 millimeter.

Figure 5A:
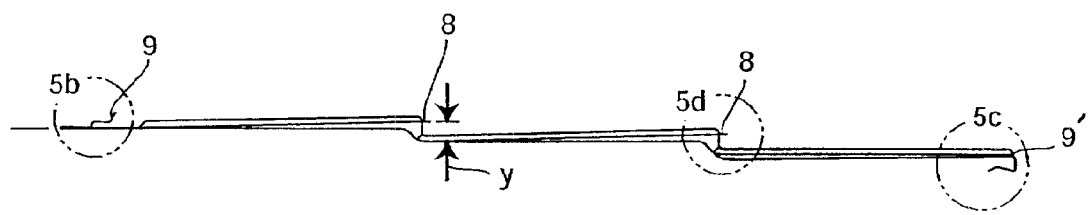
FIG. 5a is a schematic diagram showing an end view of a preferred embodiment of the panel of this invention.
Figure 5B:
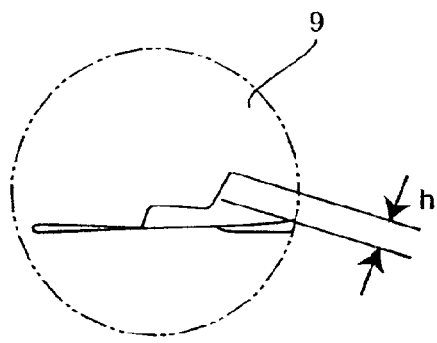
FIGS. 5b and 5c are schematic diagrams showing a more detailed side view of a rolled edge of a preferred embodiment of the panel of this invention.
Figure 5C:
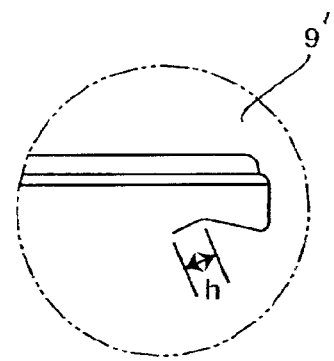

Turning now to FIG. 5a showing an end view of a preferred embodiment of the panel 100 of this invention when viewed in a direction 5—5 (See FIG. 1), one can see claws 8 along the side lap 3 and a clip 9' disposed along a bottom edge 5 of panel 100 and a hook 9 disposed along its top edge 11. FIGS. 5b and 5c show clip 9 (FIG. 5b) and hook 9' (FIG. 5c) in more detail, revealing the length, h, which is preferably within a range of between about 2 millimeters and about 4 millimeters, more preferably, about 3 millimeters. The back clip 9 and the front hook 9' are used for connecting adjacent panels 100 along their as known by those skilled in the art of roof installation.

In order to provide for lateral connecting of adjacent panels 100, a side clip connection system is provided. The side clip connection system comprises: (i) a plurality of claws 8, located on side lap 3, as mentioned above and on the side of the panel 100 opposing the side where the claws 8 are located (ii) pockets 6 formed by indentations formed in the back side (the uncoated side opposite front side 1) of the panel 100 in the risers 8' between adjacent rows of the alternatively raised and lowered sections 2.

Figure 4A:
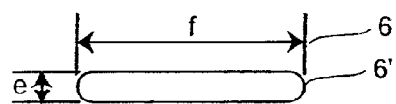
FIG. 4a is a schematic diagram showing a side view of the pocket of the panel of this invention.

Turning to FIG. 4a, the outer sides 6' of the pockets 6 are preferably located in risers 8' at a distance within a range of between about 45.5 millimeters and about 49.5 millimeters, more preferably, about 47.5 millimeters from the edge 4 of the panel 100. The pockets 6 preferably have a length, f, within a range of about 47 millimeters and about 43 millimeters, more preferably, about 45 millimeters, a width, e, within a range of between about 6 millimeters and about 4 millimeters, preferably, about 5 millimeters, and a depth (not shown) preferably, of at least about 2 millimeters.

Figure 4B:
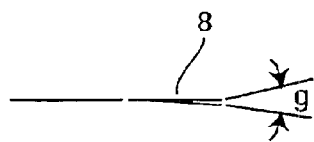
FIG. 4b is a schematic diagram showing a side view of the claw of the panel of this invention.

The claws 8 are disposed at the tops of risers 8' immediately adjacent the exposed edge of side lap 3 at an small angle, g, of preferably less than 5° (FIG. 4b) from the plane of the side lap 3. The claws 8 are preferably formed by cutting into the side lap 3 by a distance of about 2 cm when the panels 100 are formed so that the claws 8 project from the panel 100 instead of being bent around to follow the normal course of the riser 8'. The cut begins at a distance, y, which is preferably within a range of between about 3 millimeters and about 4 millimeters, from the bend 13 at the tops of the risers 81 and then proceeds toward that bend 13. (FIG. 5a). A more detailed view of a claw 8 is shown on FIGS. 4d, 4f and 5d.

Figure 4C:
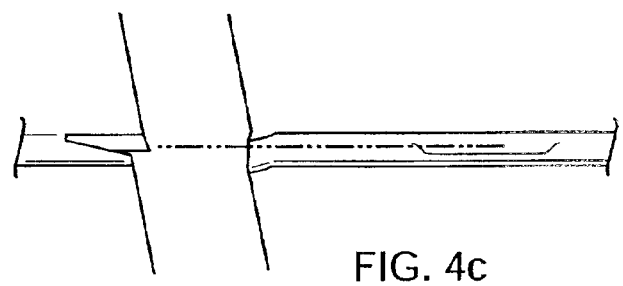
FIGS. 4c and 4d are schematic diagrams showing a side view of the assembled side clip connection system of the panel of this invention.
Figure 4D:
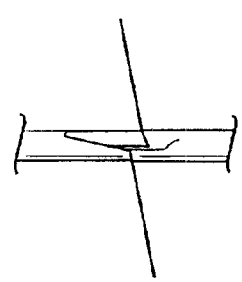
Figure 4E:
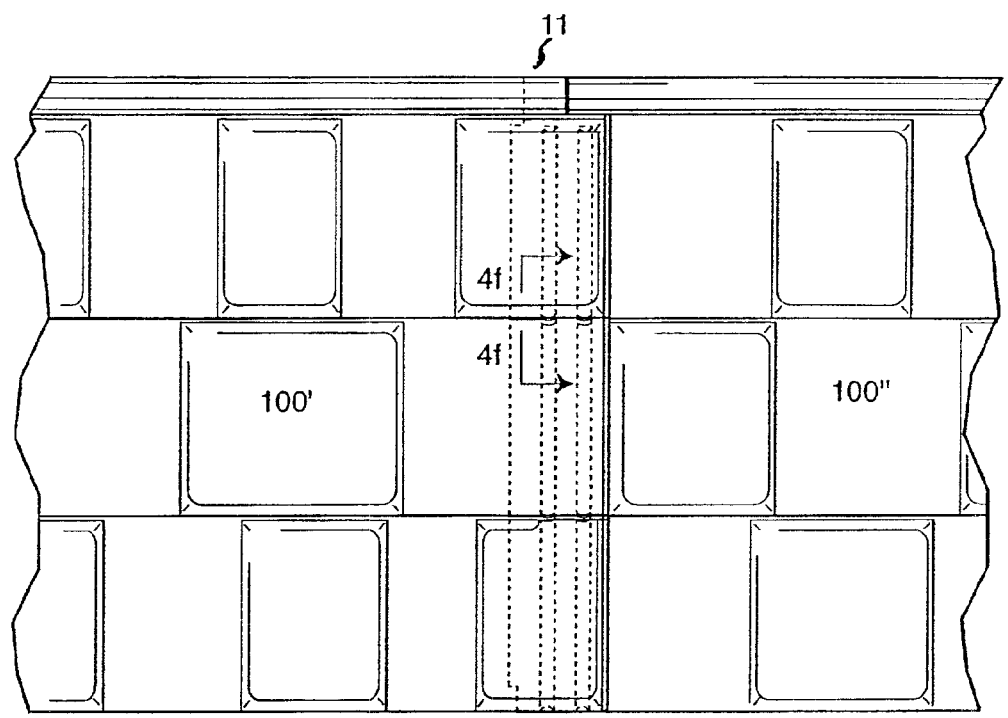
FIG. 4e is a schematic diagram showing a plan view of the assembly of the panels of this invention, the panels being laterally connected.

Turning to FIGS. 4c–4f, these figures show two panels 100' and 100" being joined along their edges. In FIG. 4c they are still spaced apart, but the risers 8' of the two panel are aligned in preparation for mating the two panels together. When a side having claws 8 of the first panel 100" is laterally attached to a side of a second panel having pockets 6 the claws 8 penetrate into the pockets 6, forming a side clip connection and thus holding the first and the second panels together, as shown by FIGS. 4d and 4e. In FIGS. 4c and 4d, only small portions of the two panels 100' and 100" are shown to emphasize the connection being made between the claw 8 and the pocket 6.

Figure 4F:
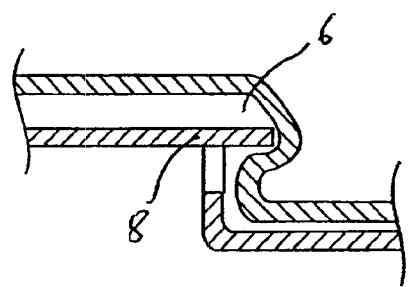
FIG. 4f is a schematic diagram showing a cross section of the assembled side clip connection system of the panel of this invention.
Figure 5D:
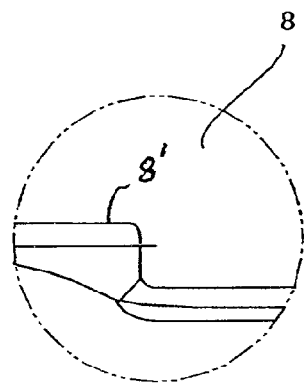
FIG. 5d is a schematic diagram showing a more detailed side view of the claw of the panel of this invention.

Obviously, the first panel 100" will then have free pockets 6 facing outwardly adjacent its remote edge 4, to which claws 8 of another third, panel can be attached; the second panel 100' will have free claws 8 facing outwardly, which can be inserted into pockets 6 of yet another, fourth, panel, and so on, thus forming an assembly of panels 100. A portion of such assembly is schematically shown on FIG. 4e, it being understood the still further panels would be arranged at edges 5' and 11 and using the previously described side clip connection. FIG. 4f shows a cross section of the side clip connection system with the claw 8 already inside the pocket 6. The depth of the pocket 6 is exaggerated somewhat in FIG. 4f for ease of illustration.

The claws 8 are conveniently protected due to the fact that the end 4 of panel 100" overlies panel 100'. The curved flange at end 4 helps keep water from getting underneath the panels. And water which does get underneath the end 4 is conveyed by channel 10 to the face of a panel in the lower course.

FIG. 4g shows four panels connected together as they may be when installed on a roof, for example. The lower row which includes panels 100' and 100" would be laid down first and laterally secured with the aforedescribed side clip connection system. Then the next row including panels 100'" and 100"" would be laid down with the clip 9' of the next row fastening to the hook 9 of the lower row.

The panel 100 described hereinabove is preferably manufactured according to the following process. The process comprises three principal stages: the roll-forming stage, the pressing stage, and the coating stage schematically shown on FIGS. 6a, 6b, and 6c. The purpose of the roll-forming and pressing stages is to convert sheet metal into pressed panels 100. The roll-forming and pressing lines are slaved to the speed of the coating line, which controls the overall speed of the process.

The roll-forming stage (FIG. 6c) begins from loading a steel coil, preferably about 620 millimeters wide, onto the uncoiler 12 whence the sheet is directed to the roll former 13. Other widths of the steel coil are possible, depending on a particular design of the metal panel 100. In the roll former 13, the three horizontal creases are formed, later to become three longitudinal rows 2', 2" and 2'" of alternatively raised and lowered sections, or patches 2, shown on FIG. 1. The metal sheet is also notched in the roll former 13 and individual pieces (or "panels") later to become panels 100 are formed.

These panels then go through the drop station unit 14 and the lowering elevator 15, and through the return conveyor 16 and the return conveyor door unit 17 and are directed to the in-feed conveyor 18.

The panels then pass the press 19 (FIG. 6b) and the press tool 20, where they are pressed into their final form (FIG. 1a). At this stage the alternating raised and lowered sections or pads 2, the side lap 3, the side lap channel 10, the claws 8 and the pockets 6 are formed, among other things. The panels are then extracted, flipped over and directed to the out-feed conveyor 21, the transfer conveyor 22 and the transfer conveyor door unit 23 onto the coating conveyor, front side 1 up.

Figure 6A:
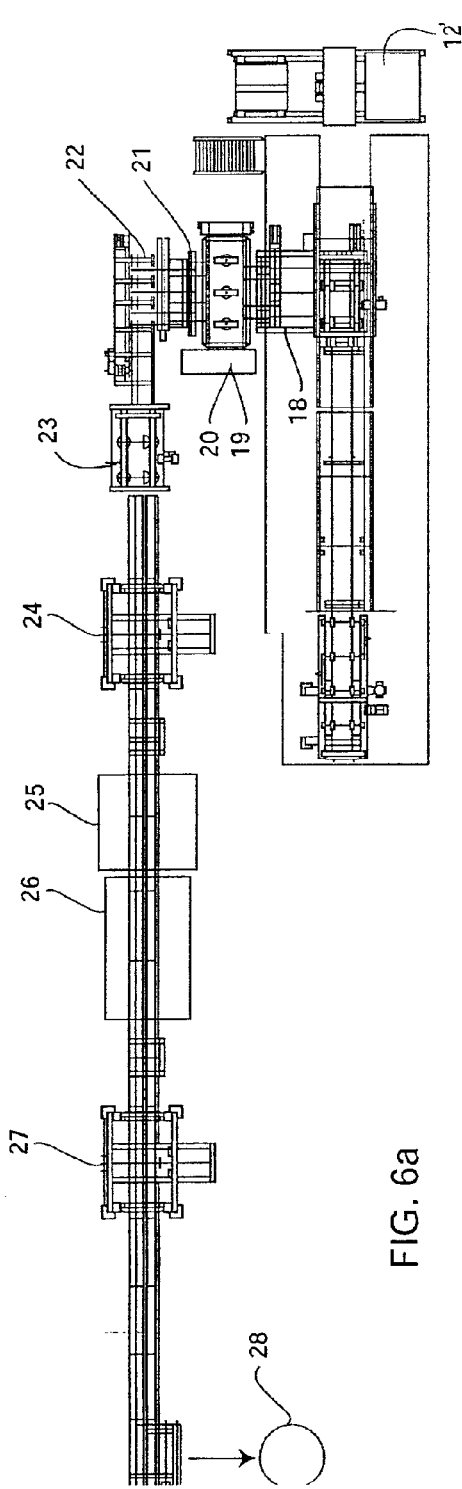
FIGS. 6a, 6b, and 6c are schematic diagrams showing the steps of a preferred method of manufacturing of the panel of this invention.
Figure 6C:
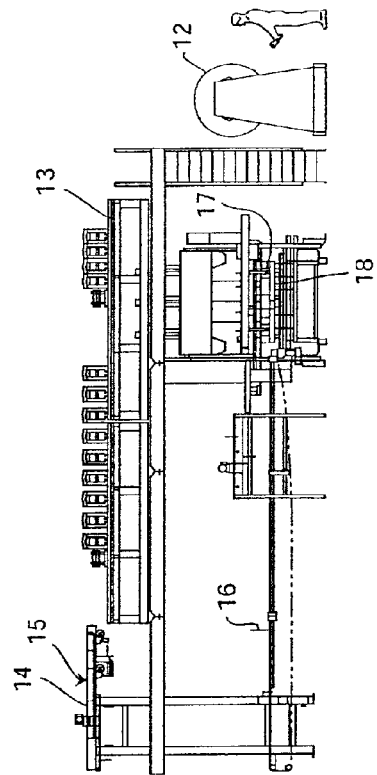
Figure 6B:
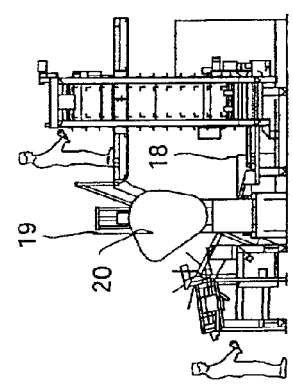

During the coating stage, the panel 100 is finished. The panels are automatically loaded onto the coating conveyor and are carried through the coating application process by pushers fitted to the conveyor chain. The coating conveyor transports the product through the basecoat spray booth 24, the chip patching booth 25, the chip booth 26f and the glaze spray booth 27 (FIG. 6a).

Basecoat is sprayed onto the bare metal panel in the basecoat spray booth 24. It features two on/off spray guns (not shown) to stop spraying if no product is present in the line. The scrubber unit (not shown), keeps a negative pressure in the booth 24 to extract any over-spray. Acrylic water-based glue, known to those skilled in the art, is used as a preferred basecoat. The preferred thickness of the basecoat is about 12 mils (about 305 micrometers).

The color patching booth 25 puts chip patches and shadow strips on the product to match and highlight the form in the panels. The stone chips are dropped onto the panels, while the panels are still wet with the basecoat. The patching unit contains three sets of three rollers (not shown), the first set for the shadow and the other two sets for the patch.

The color patch part of the system includes three pairs of servomotors (not shown), controlled by a Programmable Logic Controller (PLC), driving three pairs of grooved rollers which carry premixed stone granules from two different hoppers and apply them in patches to the metal panels. The paired rollers meter and blend two contrasting mixes of granules and precisely drop them as color patches on the panels.

The use of a PLC to control the servomotors that drive the grooved rollers allows not only precise patch size, through starting and stopping the motors at precisely the right moment as the panel travels under the rollers, but also different shading or shadowing of the mixes of stone through controlling the servomotors' speed of rotation.

This second part of the system, to provide shadow and highlight, comprises three PLC controlled servomotor-driven grooved rollers that apply narrow bands of stone granules at the rear and front of each step in the metal panel. This system is located immediately before the granule patching system described above and it works in tandem with the granule patching equipment to discharge granules on panel locations with or without the contrasting color patches. Two hoppers (not shown) feed granules through three grooved rollers.

The quantity of granules delivered, and therefore the intensity of the color, can be controlled by varying the speed of rotation of the servomotors. The width of the bands of color can be adjusted by moving divider plates in the delivery hoppers above the grooved rollers. The divider plates can be set at an angle to achieve a flared shadow effect with one edge of the shadow band being heavier (containing more stone granules) than the other edge.

The chip booth 26 coats the product evenly with its base, or background, color. In the chip booth 26 all the gaps between the patches, shadows and highlights already on the panel are filled with a mixed blend of stone granules and then all excess loose granules are removed. The chips are dropped via two drops of chips with blow on nozzles to help chip coverage. The excessive amount of the stone chip is blown off by air.

As a result of the process of application of the stone chips, the surface is provided with a "patterned" surface having differing colors and shades in different areas. The colors of particular areas is determined by the ratio of differently colored stone granules, to create a variety of colors and shades, preferably, a fawn grey, a canyon brown and a vintage slate colored panels. Four mixes of the granules are preferably used: one very light, one dark, and two in between.

The color and shades are coordinated with the raised and lowered patches so that the appearance of depth of the panel is enhanced by creating shadows with darker colors. Preferably, granules of a dark color are delivered adjacent and immediately below the risers 8' so as to give the impression of a shadow caused by the riser. The "fake" shadow gives the impression that the riser is higher than it really is. This has an ornamental advantage of being attractive without weakening the panel or using additional metal in its manufacture.

The stone granules used in this process are preferably grade 14 ceramic coated stone granules supplied by the Minnesota Mining and Manufacturing Company of Saint Paul, Minn. Other sizes of the stone granules can be used. Those skilled in the art will use such other grades by first adjusting the viscosity of the basecoat, according to commonly used practices.

The method of the application of the stones is unique. It allows to precisely place patches of different color mixes of stone granules on the metal panel.

Finally, the glaze spray booth 27 coats the product with its glaze layer, or a sealant layer. A water-based acrylic adhesive is preferably used as a glaze, or a sealant, to achieve a wet thickness of about 1 mil (about 25 micrometers). The glaze spray booth 27 features two on/off spray guns (not shown) to stop spray if no product is present in the line. The scrubber unit keeps a negative pressure in the booth to extract any over-spray. The basecoat is so thick and viscous that the stone granules stick to the panels in the positions in which they are dropped onto the panels by the patching, shadowing, highlighting and stone granule applicator systems.

Fully coated panels are then transferred into an oven 28 where the basecoat and glaze are cured at a preferred initial temperature of about 60° C., which temperature is gradually raised up to about 100° C. The curing time is preferably within a range of between about 65 minutes to about 75 minutes, more preferably, about 70 minutes.

A complete engineering drawing of the panel of this invention is attached herewith as Appendix A.

Having described the invention in connection with several embodiments thereof, modification will now suggest itself to those skilled in the art. As such, the invention is not to be limited to the described embodiments except as required by the appended claims.

We claim:

1. A roof panel comprising a metal panel having a front surface and a back surface, a lengthwise edge, a first lateral edge and a second lateral edge, said panel further comprising:
   (a) a lap including at least one claw, said lap being disposed along said first lateral edge of said panel;
   (b) a side lap channel disposed adjacent said lap; and
   (c) at least one pocket disposed on said back surface adjacent said second lateral edge,
   whereby said at least one claw of a first panel are engagedly connected with said at least one pocket of a second adjacent panel to form a side clip connection when said first lateral edge of said first panel and said second lateral edge of said second panel are brought together to form an assembly.

2. The panel as claimed in claim 1, further comprising a plurality of alternating raised and lowered sections, wherein said sections are arranged longitudinally in a plurality of rows to mimic individual non-metal shingles.

3. The panel as claimed in claim 1, wherein said metal panel has a substantially rectangular shape.

4. The panel as claimed in claim 2, wherein said front surface of said metal panel is coated with a stone-chip based coating in a plurality of color mixes in selectable locations to form a pattern of differently colored areas, said areas being coordinated with said alternating raised and lowered sections.

5. The panel as claimed in claim 1, wherein a metal of said metal panel comprises steel.

6. The panel as claimed in claim 2, wherein said plurality of rows comprises three rows.

7. The panel as claimed in claim 3, wherein said metal panel has a length of about 1.35 meters and a width of about 0.5 meters.

8. The panel as claimed in claim 4, wherein said stone-chip based coating comprises a cured adhesive, stone granules held in place by said adhesive, and a sealant.

9. The panel as claimed in claim 5, wherein said metal panel has a thickness of between about 0.42 millimeters and about 0.46 millimeters.

10. The panel as claimed in claim 5, further comprising a zinc-aluminum alloy applied on said surfaces of said metal panel.

11. The panel as claimed in claim 8, wherein said adhesive comprises an acrylic water-based composition.

12. The panel as claimed in claim 8, wherein said sealant comprises a clear acrylic water-based glaze composition.

13. The panel as claimed in claim 8, wherein said stone granules are made of ceramic coated stone.

14. The panel as claimed in claim 8, wherein said pattern of differently colored areas is achieved by steps of:
   (a) providing said granules having differing colors;
   (b) preparing mixtures of said granules ratios between said granules having colors; and having differing said differing colors; and
   (c) applying said mixtures to pre-selected areas of said panel.

15. The panel as claimed in claim 1, wherein the claw comprising:
   a horizontal part in parallel with the metal panel; and
   a vertical part fixedly attached to the horizontal part, the vertical part being perpendicular with the horizontal part to form a T-shaped structure.

16. The panel as claimed in claim 15, wherein the pocket comprising:
   an L-shaped first part adapted to support the vertical part of the claw; and
   a second portion having a curved portion adapted to receive support the horizontal part of the claw.

17. The panel as claimed in claim 1, wherein the claw and the pocket are engagedly connected in such a way that the claw is supported in a first direction in perpendicular with the metal panel and restrained in a second direction in parallel with the metal panel.

18. A roof panel comprising a metal panel having a front surface and a back surface, a lengthwise edge, a first lateral edge and a second lateral edge, said panel further comprising:

(a) a lap including at least one claw, said lap being disposed along said first lateral edge of said panel;

(b) at least one pocket disposed on said back surface adjacent said second lateral edge, whereby said at least one claw of a first panel are engagedly connected with said at least one pocket of a second adjacent panel to form a side clip connection when said first lateral edge of said first panel and said second lateral edge of said second panel are brought together to form an assembly; and (c) a plurality of alternating raised and lowered sections, wherein said sections are arranged longitudinally in a plurality of rows to mimic individual non-metal shingles.

19. The panel as claimed in claim 18, wherein said front surface of said metal panel is coated with a stone-chip based coating in a plurality of color mixes in selectable locations to form a pattern of differently colored areas, said areas being coordinated with said alternating raised and lowered sections.

20. The panel as claimed in claim 18, further including a side lap channel disposed adjacent said lap.

21. The panel as claimed in claim 18, wherein said plurality of rows comprises three rows.

22. The panel as claimed in claim 19, wherein said stone-chip based coating comprises a cured adhesive, stone granules held in place by said adhesive, and a sealant.

23. A roof panel comprising a metal panel having a front surface and a back surface, a lengthwise edge, a first lateral edge and a second lateral edge, said panel further comprising:

(a) a lap including at least one claw, said lap being disposed along said first lateral edge of said panel;

(b) at least one pocket disposed on said back surface adjacent said second lateral edge, whereby said at least one claw of a first panel are engagedly connected with said at least one pocket of a second adjacent panel to form a side clip connection when said first lateral edge of said first panel and said second lateral edge of said second panel are brought together to form an assembly; and (c) a zinc-aluminum alloy applied on said surfaces of said metal panel, wherein a metal of said metal panel comprises steel.

24. The panel as claimed in claim 23, further comprising a plurality of alternating raised and lowered sections, wherein said sections are arranged longitudinally in a plurality of rows to mimic individual non-metal shingles.

25. The panel as claimed in claim 23, wherein said metal panel has a substantially rectangular shape.

26. The panel as claimed in claim 24, wherein said front surface of said metal panel is coated with a stone-chip based coating in a plurality of color mixes in selectable locations to form a pattern of differently colored areas, said areas being coordinated with said alternating raised and lowered sections.

27. The panel as claimed in claim 23, further including a side lap channel disposed adjacent said lap.

28. The panel as claimed in claim 23, wherein said metal panel has a length of about 1.35 meters and a width of about 0.5 meters.

29. The panel as claimed in claim 23, wherein said metal panel has a thickness of between about 0.42 millimeters and about 0.46 millimeters.

* * * * *